(12) United States Patent
Chisholm et al.

(10) Patent No.: US 6,934,629 B1
(45) Date of Patent: Aug. 23, 2005

(54) METHOD AND APPARATUS FOR PRECISE POSITIONING OF LARGE STRUCTURES

(75) Inventors: Gary Sedman Chisholm, Christchurch (NZ); Michael Hansby, Christchurch (NZ); Brent O'Meagher, Christchurch (NZ); Alan Monnox, Christchurch (NZ)

(73) Assignee: Trimble Navigation Ltd., Sunnyvale, CA (US)

( * ) Notice: Subject to any disclaimer, the term of this patent is extended or adjusted under 35 U.S.C. 154(b) by 499 days.

(21) Appl. No.: 09/049,161

(22) Filed: Mar. 26, 1998

Related U.S. Application Data

(62) Division of application No. 08/676,719, filed on Jul. 8, 1996, now Pat. No. 5,883,817.

(51) Int. Cl.⁷ .............................................. G01C 21/26
(52) U.S. Cl. ....................................... 701/213; 340/988
(58) Field of Search ................................. 701/213, 215, 701/221, 220, 208, 212; 340/988, 989, 436; 342/357.01, 357.12

(56) References Cited

U.S. PATENT DOCUMENTS

| | | | | |
|---|---|---|---|---|
| 4,613,866 A | * | 9/1986 | Blood | 342/448 |
| 5,363,307 A | * | 11/1994 | Yoshida | 701/219 |
| 5,559,520 A | * | 9/1996 | Barzegar et al. | 342/357.1 |
| 5,657,226 A | * | 8/1997 | Shin et al. | 701/23 |
| 5,684,696 A | * | 11/1997 | Rao et al. | 701/25 |
| 5,699,244 A | * | 12/1997 | Clark, Jr. et al. | 702/2 |
| 5,729,217 A | * | 3/1998 | Ito et al. | 340/988 |
| 5,751,246 A | * | 5/1998 | Hertel | 342/357.07 |
| 5,821,880 A | * | 10/1998 | Morimoto et al. | 340/995 |
| 5,862,495 A | * | 1/1999 | Small et al. | 701/13 |
| 5,883,817 A | * | 3/1999 | Chisholm et al. | 395/500.01 |
| 5,907,111 A | * | 5/1999 | Josten et al. | 73/866.5 |
| 5,908,464 A | * | 6/1999 | Kishigami et al. | |
| 5,935,194 A | * | 8/1999 | Talbot et al. | 701/214 |
| 5,944,768 A | * | 8/1999 | Ito et al. | 701/200 |
| 5,955,973 A | * | 9/1999 | Anderson | 340/988 |
| 5,956,250 A | * | 9/1999 | Gudat et al. | 318/587 |
| 6,006,161 A | * | 12/1999 | Katou | |
| 6,018,313 A | * | 1/2000 | Engelmayer et al. | 342/357 |
| 6,018,696 A | * | 1/2000 | Matsuoka et al. | 701/207 |
| 6,021,374 A | * | 2/2000 | Wood | 701/301 |
| 6,028,537 A | * | 2/2000 | Suman et al. | 340/988 |
| 6,032,084 A | * | 2/2000 | Anderson et al. | 700/241 |
| 6,052,083 A | * | 4/2000 | Wilson | 342/357.17 |
| 6,064,398 A | * | 5/2000 | Ellenby et al. | 345/435 |
| 6,076,041 A | * | 6/2000 | Watanabe | |
| 6,081,231 A | * | 6/2000 | Evans et al. | 342/357.13 |
| 6,094,625 A | * | 7/2000 | Ralston | 702/150 |
| 6,140,957 A | * | 10/2000 | Wilson et al. | 342/357.08 |

* cited by examiner

*Primary Examiner*—William A. Cuchlinski, Jr.
*Assistant Examiner*—Olga Hernandez
(74) *Attorney, Agent, or Firm*—Blakely Sokoloff Taylor & Zafman LLP

(57) ABSTRACT

A three dimensional structure is precisely positioned at a desired location. A viral model of the structure of interest is created and stored in a computer memory. Some time later, remote sensors are placed in selected positions on the structure of interest. The sensors are configured so as to provide real time location, attitude and orientation information regarding the structure and may consist of GPS remote units, tilt meters, gyro compasses, and pressure sensor. The position of each the remote sensors on the actual structure is also recorded in the computer memory so that the virtual model accurately reflects the configuration of the structure. As the structure is being positioned, the real-time location, attitude and orientation information produced by the remote sensors is monitored at a base station and used to update the virtual model. In this way, the virtual model accurately reflects the current location, attitude and orientation of the structure. The information so obtained can be displayed to a user as a graphical and textual representation of the current state of the structure. The desired location, attitude and orientation of the structure is also displayed, thereby allowing a user to adjust the current location, attitude and orientation of the structure so as to align the current position of the structure to desired position. As built reports are produced upon completion of the positioning operation.

10 Claims, 6 Drawing Sheets

METHOD AND APPARATUS FOR PRECISE POSITIONING OF LARGE STRUCTURES

This application is a Divisional of application Ser. No. 08/676,719, filed Jul. 8, 1996, now U.S. Pat. No. 5,883,817.

FIELD OF THE INVENTION

The present invention relates generally to real time navigation systems and, more particularly, to the use of such systems for the precise positioning of large structures.

BACKGROUND

In the marine environment, construction personal are often faced with task of positioning large, three dimensional structures within confined spaces. For example, during construction in ports and other areas, it is common for structures such as bridge sections and tunnel sections to be moved by crane and barge into a desired location. Also, during the construction of oil-rig platforms, it is common for large pilings to be placed on the ocean floor using a piling-rig.

Accurate, on going determination of the position of structures such bridge sections is required during all phases of the construction operation. In order that the bridge be properly configured at completion, horizontal and vertical displacements of even a few centimeters must be avoided. Displacements which are accidentally built into the path of a bridge, for example, may require expensive correction before the bridge can be placed in operation.

Traditional methods of monitoring the placement of structures such as a bridge under construction involve the use of a variety of surveying techniques. These may include visible lasers and/or optical theodolites. Such methods are not particularly convent because they require trained personal to visit the construction site each time a new bridge section is being placed.

Modem surveying methods are able to make use of remote positioning systems which may be satellite- or land-based. The satellite system most commonly used today is the Global Positioning System (GPS) although others, such as the Global Orbiting Navigation System (GOLNASS) are also in use or under development. Some land-base systems which effectively simulate the satellite-based systems for a small area are also in development. These generally involve the use of pseudolites. Engineering and surveying methods which use these systems can be markedly more efficient and accurate than traditional methods.

Use of GPS in surveying typically involves a single operator who sets up a base station with an antenna positioned over a control point having a known position. The surveyor then moves about a construction site with a mobile unit having its own antenna. The operator places the mobile antenna over unknown survey points in the field to record their position using signals transmitted by a number of in-view satellites. A vector or baseline is determined from the basesite to the mobile unit. Survey points whose positions are measured in this fashion may, in turn, become control points from which measurements of other unknown points may be taken. The use of GPS during a survey procedure may be combined with other techniques such as distance and angle measurements taken with GPS stations which may be placed at one of the control points.

Each GPS satellite transmits two coded L-band carrier signals which enable some compensation for propagation delays though the ionosphere. Each GPS receiver contains an almanac of data describing the satellite orbits and uses ephemeris corrections transmitted by the satellites themselves. Satellite to antenna distances may be deduced from time code or carrier phase differences determined by comparing the received signals with locally generated receiver signals. These distances are then used to determine the antenna position. Only those satellites which are sufficiently above the horizon can contribute to a position measurement, the accuracy of which depends on various factors including the geometrical arrangement of the satellites at the time when the distances are determined.

Distances measured from an antenna to four or more satellites enable the antenna position to be calculated with reference to the global ellipsoid WGS-84. Local northing, easting and elevation coordinates can then be determined by applying appropriate datum transformation and map projection. By using carrier phase differences in any one of several known base or mobile receiver techniques, the mobile antenna coordinates can be determined to an accuracy on the order of ±1 cm. Using such real time kinematic (RTK) techniques, an operator can obtain position measurements within seconds of placing a mobile antenna on a unknown point. In RTK systems, satellite correction data is transmitted by a radio or other link between the base and mobile receivers, whether or not there is a clear line of site to ensure that accuracy in the mobile position measurements is maintained and the survey information is correct.

SUMMARY OF THE INVENTION

According to one embodiment, a three dimensional structure is precisely positioned at a desired location. To begin, a virtual model of the structure of interest is created and stored in a computer memory. Some time later, remote sensors are placed in selected positions on the actual structure of interest. The sensors are configured so as to provide real time location, attitude and orientation information regarding the structure and may consist of GPS remote units, tilt meters, gyro compasses, and pressure sensors. The position of each remote sensor on the actual structure is also recorded in the computer memory so that the virtual model of the structure accurately reflects the real world situation. As the structure is being positioned, real time location, attitude and orientation information produced by the remote sensors is monitored at a base station and used to update the virtual model with respect to a predefined coordinate system. In this way, the virtual model accurately reflects the current location, attitude and orientation of the structure. The information so obtained can be displayed to a user as a graphical and textual representation of the current state of the structure. In addition, the desired location, attitude and orientation of the structure is displayed. Such a display is then used by an operator to adjust the current location, attitude and orientation of the structure so as to align the current position of the structure with the desired position. In this way, this structure can be precisely positioned. As built reports can be generated once the positioning operation is complete.

BRIEF DESCRIPTION OF THE DRAWINGS

The present invention is illustrated by way of example and not limitation in the figures in the accompanying drawings in which:

FIG. 3b illustrates a pair of X-Y tilt vials within the tilt meter of FIG. 3a;

DETAILED DESCRIPTION

Figure 1:
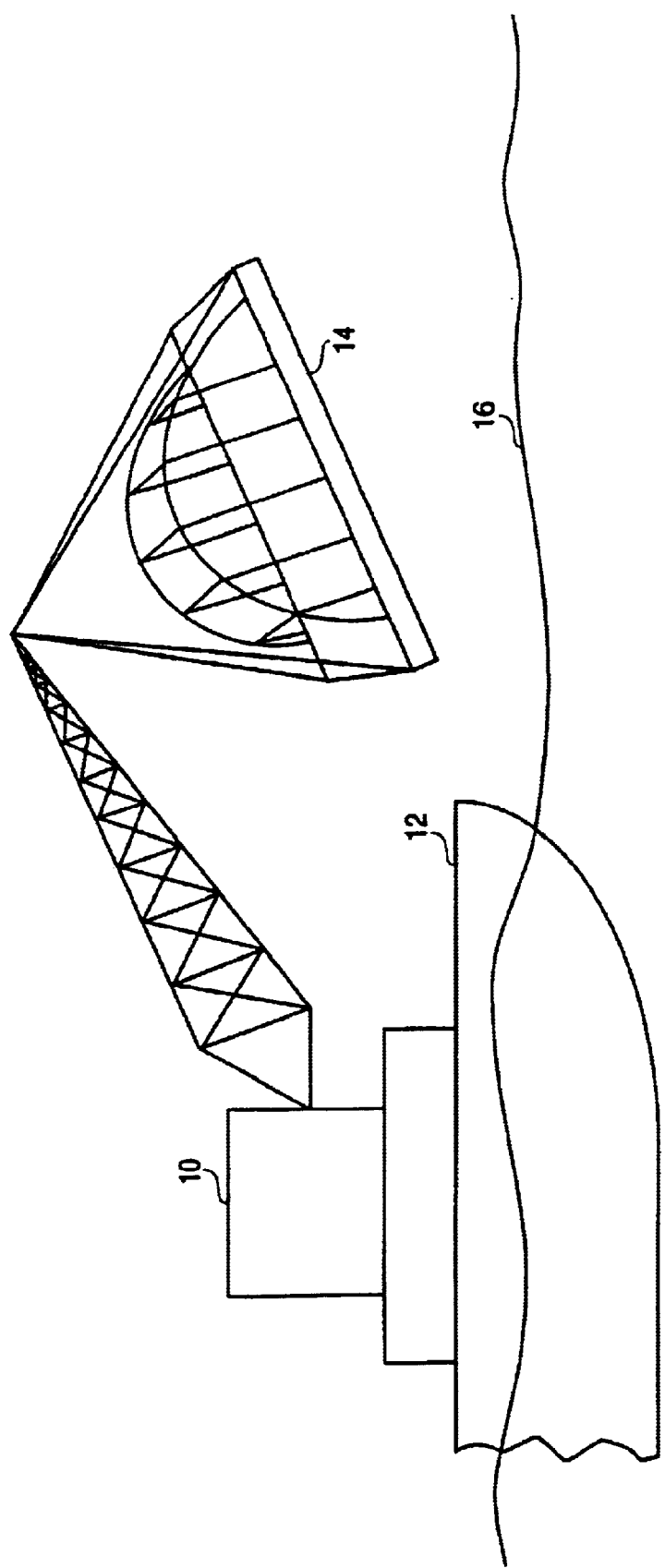
FIG. 1 is a schematic view illustrating the use of a crane to position a bridge section.

Referring to the drawings in detail wherein like numerals designate like parts and components, the following description sets forth numerous specific details in order to provide a though understanding of the present invention. However, after reviewing this specification, it will be apparent to those skilled in the art that the present invention may be practiced without some or all of these specific details. In other instances, well known structures, programming techniques and devices have not been described in detail in order not to unnecessarily obscure the present invention.

FIG. 1 illustrates the precise positioning of a bridge section or other large structure according to the present invention. Crane 10 is situated on barge 12 and is in the processes of positioning bridge section 14. Barge 12 may be in the process of navigating a waterway 16 such as a channel or port. As will be described below, the positioning of bridge section 14 is aided by the use of a variety of positioning sensors which are monitored at a base station. The base station may be located on barge 12 within crane 10. Alternatively, the base station may be located at another site.

Figure 2:
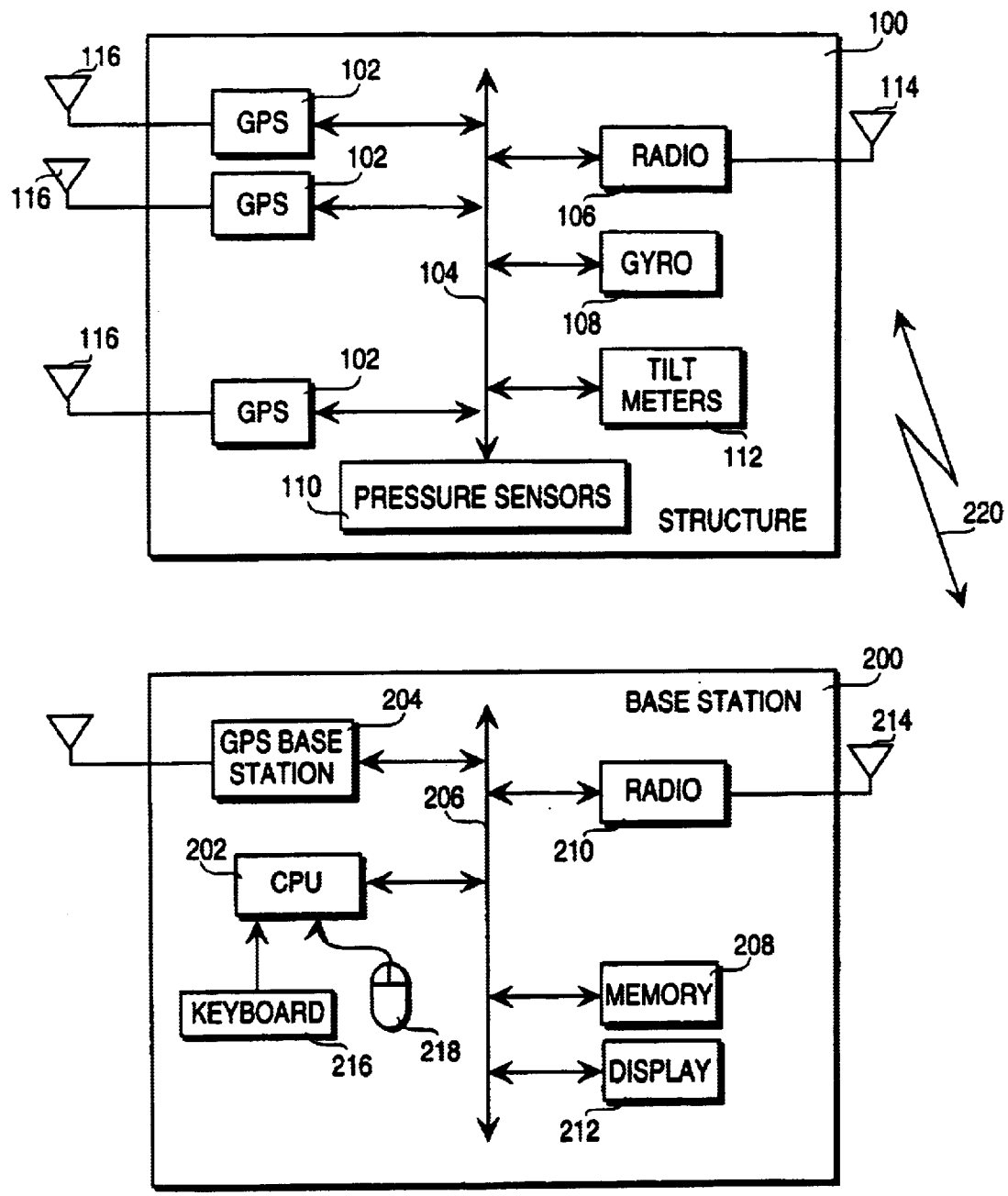
FIG. 2 illustrates a precise positioning system according to one embodiment.

FIG. 2 further illustrates a positioning system according to the present invention. Structure 100 may, in one embodiment, be bridge section 14 as shown in FIG. 1. Structure 100 may also be any one of a number of other structures, for example, a tunnel section. Located on structure 100 are a verity of sensors including a number of GPS sensors 102, a gyro compass 108, a number of pressure sensors 110, and one or more tilt meters 112. The various sensors 102, 108, 110 and 112 are all linked to a radio 106 via a system bus 104. Radio 106 includes antenna 114 for use in communicating with the a base station 200.

Base station 200 includes a central processing unit 202, a GPS base station 204, memory 208, radio 210, and a display 212. Radio 210 includes antenna 214. Each of these components is linked by a bus 206. Associated with central processing unit 202 is a keyboard 216 and a mouse or other cursor control device 218. The base station 200 communicates with the various sensors on structure 100 via radio link 220. Those skilled in the art will appreciate that other forms of communication links, such as infra red or other optical links, could be used. Alternatively, conditions permitting, hardwire links could also be used.

Onboard structure 100, each of the various sensors 102, 108, 110, and 112, is positioned in a strategic location. For example, each GPS sensor 102 has an associated antenna 116. Each antenna is positioned in a location of interest onboard structure 100. With reference to bridge section 14 in FIG. 1, antennas 116 might be positioned at each of the four corners of bridge structure 14 and another antenna 116 might be located on the highest point on bridge structure 14. In this way, positioning information from each location of interest on structure 100 can be obtained from the various GPS sensors 102. Although described with reference to individual GPS sensors 102 for each antenna 116, those skilled in the art will appreciate that a single GPS sensor 102 could be used with a number of antennas 116 connected thereto. In such an embodiment, GPS sensor 102 would include an antenna switch for switching between each of the various antennas 116 located at different positions on structure 100. In this way, positioning information for each location associated with an antenna 116 could be obtained in a sequential fashion. For those applications where simultaneous, real-time positioning information from each location associated with an antenna 116 is not required such an embodiment is sufficient However, where real-time, simultaneous positioning information is required, individual GPS sensors 102, each with its own antenna 116, will be required.

GPS sensors 102 are each capable of receiving GPS signals from in-view satellites and producing positioning information therefrom. In order to derive centimeter level accurate positioning information, GPS sensors 102 communicate with GPS base station 204 via radio link 220. GPS base station 204 provides real-time kinematic correction information to allow GPS sensors 102 to produce real-time, centimeter level accurate positioning information. The manner in which such calculations are derived is well known in the art. Alternatively, GPS base station 204 could produce differential GPS (DGPS) correction information and provide same to GPS sensors 102 via radio link 220. Those skilled in the art will appreciate that if DGPS correction data is used, the positioning information derived from GPS sensors 102 will be on the order of ±1 meter.

In addition to GPS sensors 102, structure 100 includes other sensors. For example, gyro compass 108 is located on structure 100 and produces orientation information regarding structure 100 with reference to true north. If gyro compass 100 is properly aligned with a centline or other reference on structure 100, real-time heading information regarding structure 100 can be obtain from gyro compass 108. Those skilled in the art will appreciate that the use of a gyro compass 108 involves certain limitations. For example, gyro compass 108 requires a certain setup time, on the average of four hours, before accurate heading information is available. In some cases, gyro compass 108 may be a ring laser gyro compass, however, this will still require a sufficient setup time. In alternative embodiments, the use of gyro compass 108 is not required because GPS sensors 102 with associated antennas 116 are located along the centerline or other reference line of structure 100. By comparing the relative positions of each of the antennas 116 so located, a vector between the antennas can be derived and the orientation of structure 100 with respect to a given coordinate system can be derived therefrom.

For the case where portions of structure 100 will be located below water level, pressure sensors 110 are mounted in various locations. The use of pressure sensors 110 allows for the transmission of pressure or depth information via radio link 220. Such information can be used for the accurate positioning of structure 100.

Figure 3A:
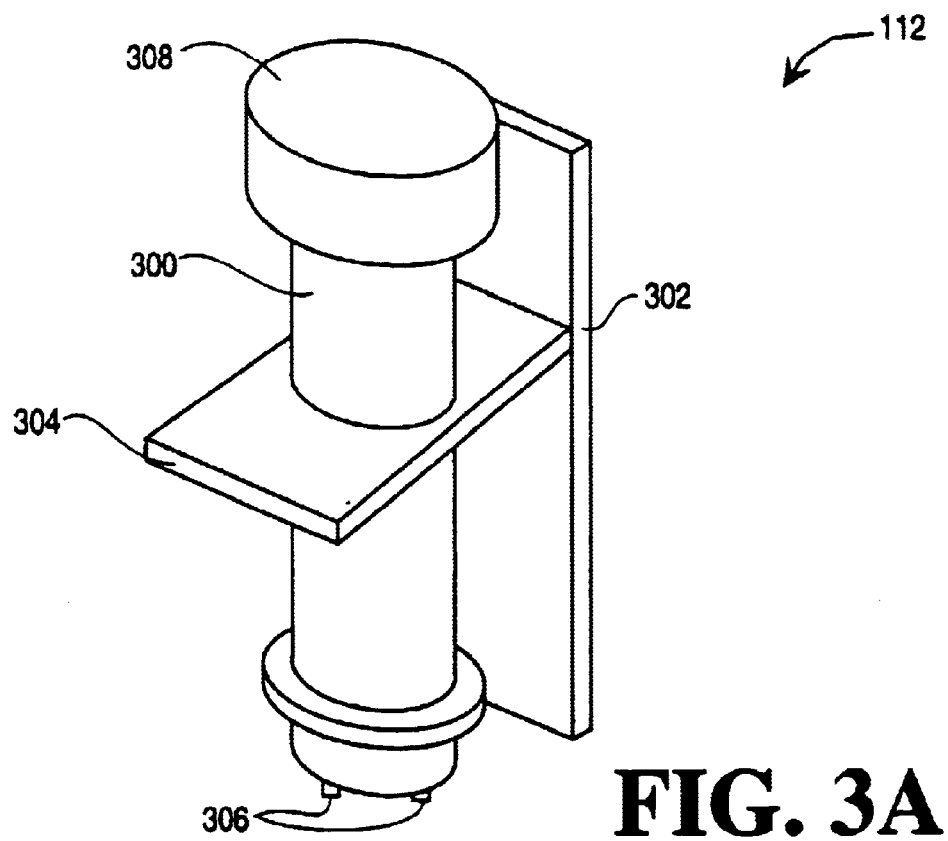
FIG. 3a illustrates a tilt meter.
Figure 3B:
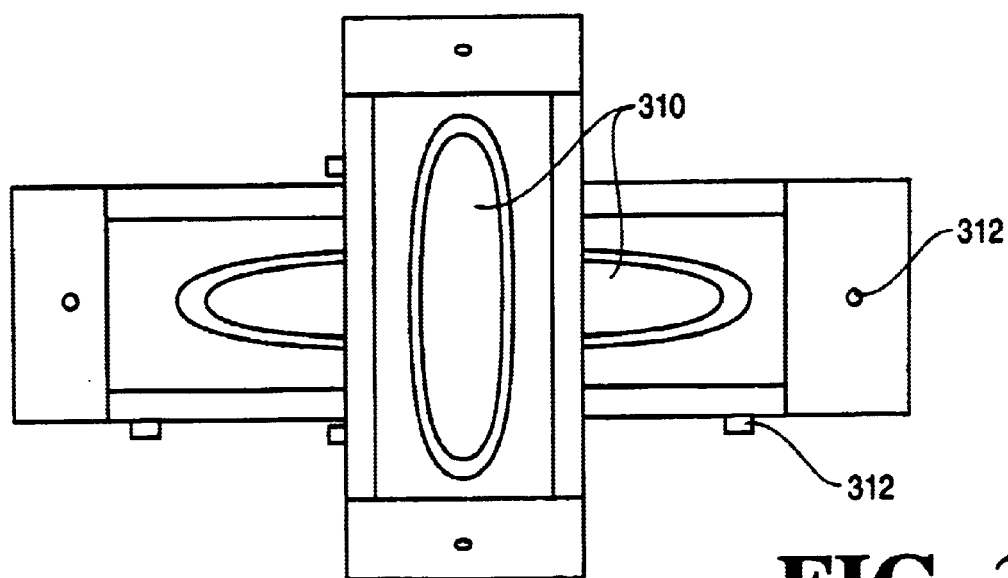
Figure 4A:
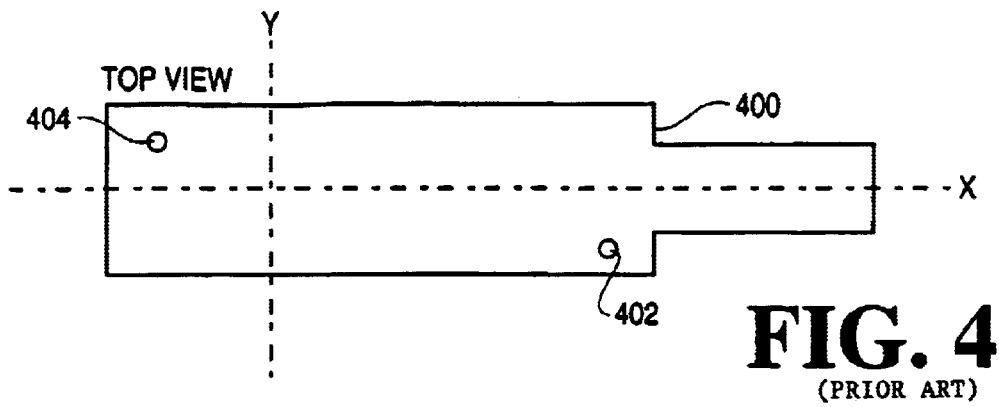
FIGS. 4a–4d illustrate various views of a three dimensional structure.
Figure 4B:
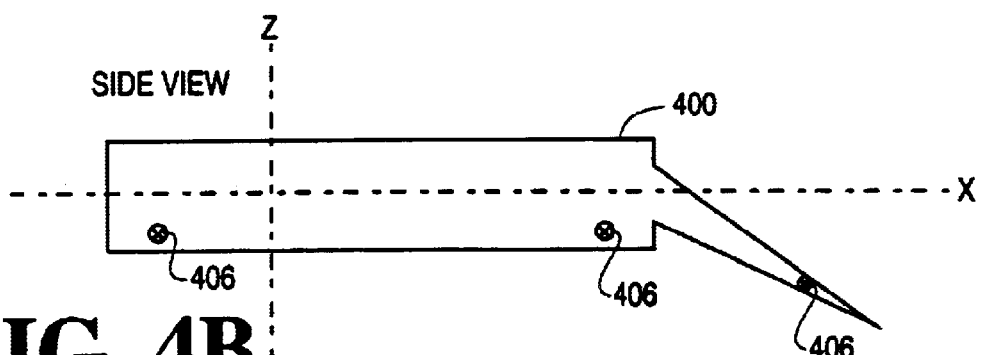
Figure 4C:
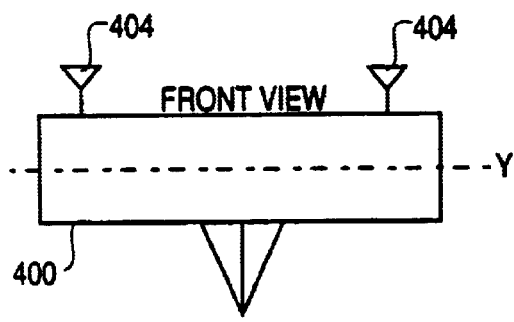
Figure 4D:
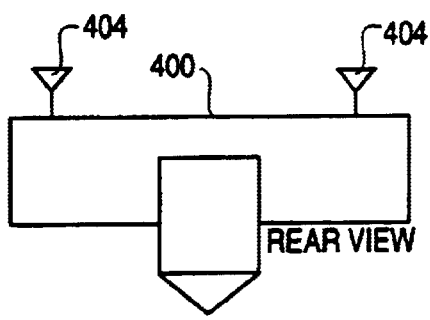

In addition, various tilt meters 112 can also be located on structure 100 in strategic locations. Tilt meters 112 can provide accurate two dimensional orientation data concerning structure 100. Referring briefly to FIGS. 3a and 3b, an exemplary tilt meter 112 is shown. Tilt meter 112 includes a plate 302 for attachment to structure 100 and housing 300 which is fastened to the plate 302 by a bracket 304. Lid 308 of the housing 300 can be removed to reveal two perpendicular vials 310 which lie parallel to the bracket 304. Liquid in each vial 310 is electrically monitored by circuitry within the housing 300 to produce tilt measurement data though output ports 306. Each tilt meter 112 is mounted on structure 100 in a known orientation, preferably to yield tilt data in a horizontal or vertical plane. Each tilt meter 112 is then calibrated in this known state of tilt. The vials 310 are preferably oriented to yield Cartesian tilt components. Where required, the Cartesian tilt components may be converted later into angler bearing and deviation components. Placement and calibration of tilt meters 112 will normally take place under controlled conditions when the structure 100 is laying horizontal and not subject to movement. The vials 310 are adjusted and locked by screws 312 during the calibration process. For the example shown in FIG. 1, tilt meters 112 may be positioned along horizontal and vertical members of bridge section 14. Tilt meters 112 so positioned would give orientation data in the horizontal and vertical planes, thus allowing accurate positioning of bridge section 14.

Alternatively, tilt meters 112 may be calibrated using software. In such an embodiment, tilt meters 112 are attached to structure 100 in strategic locations, e.g., along the major axes of structure 100, while structure 100 is stationary. Tilt measurement data obtained from output ports 306 is interfaced to CPU 202, e.g. using a communication link as discussed below, or a serial or other data connection. Software running on CPU 202 interprets the tilt measurement data and generates a tilt value for each axis. The tilt value is then stored to be used later as a correction factor (or calibration value) for all subsequent tilt measurements. For example, if the initial tilt value was determined to be $2.123^C$ of roll, all subsequent tilt measurements would first be corrected by subtracting $2.123^C$ of roll before a final tilt value was produced. This is similar to taring a scale while weighing a container and its contents.

Returning to FIG. 2, base station 200 receives the various positioning information, including GPS information from GPS sensors 102, orientation information from gyro compass 108, pressure or depth information from pressure sensors 110, and tilt data from tilt meters 112 via radio link 220. Radio signals from structure 100 are received at antenna 214 and demodulated by radio 210 under the control of central processing unit (CPU) 202. This data may be stored in memory 208 or another data storage device (not shown) for, archiving purposes. In other embodiments, CPU 202 is located onboard structure 100 to provide onboard operators with real-time positioning displays as discussed below. In such cases, radio link 220 is primarily used to transmit RTK or DGPS correction information between GPS base station 204 and GPS sensors 102.

CPU 202 is also provided with a virtual model of structure 100. The virtual model is a three dimensional digital representation of the structure 100 and is typically stored in memory 208 prior to the positioning operation. FIG. 4 shows how an arbitrary three dimensional structure might be represented in a virtual model. Structure 400 is defined with reference to an XYZ coordinate system as shown. Structure 400 might represent a bridge section such as bridge section 14 shown in FIG. 1, or some other structure that requires positioning. Using programming techniques well known in the art, structure 400 is represented in a digital format and stored in a data structure in memory 208. As each of the sensors 102, 108, 110 and 112 are positioned on the real world structure 400, their locations are recorded within the virtual model. For example, GPS antennas 116 might be located at positions 404 and 402. These reference points are included in the virtual model with reference to the XYZ coordinate system. Similarly, pressure sensors 110 might be located at positions 406. Positions 406 are also recorded in the virtual model with the reference to XYZ coordinate system. In this way, the virtual model is updated to reflect the real world configuration of structure 400.

Figure 5:
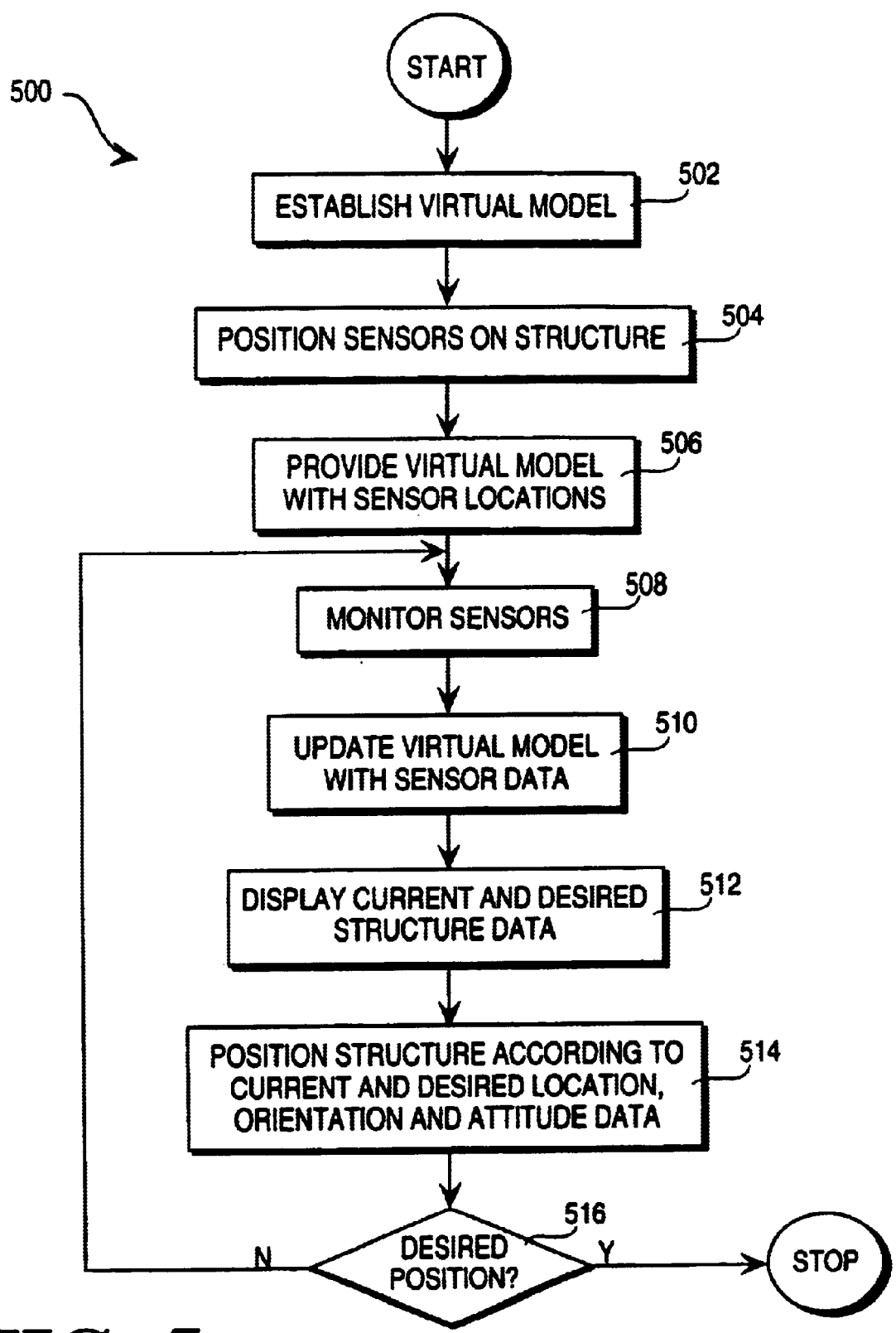
FIG. 5 is a flow diagram illustrating a method of precisely positioning a large structure according to one embodiment.

The XYZ coordinate system is a local coordinate system. This may be translated to a real world coordinate system using transformation techniques well known in the art The virtual model so established can be used for accurate positioning of structure 100 as follows and as illustrated in the flow diagram of FIG. 5. FIG. 5 shows a process 500 for the precise positioning of a structure 100 such as bridge section 14 shown in FIG. 1. At step 502, the virtual model of the structure of interest is established and stored in memory. As indicated above, the virtual model is a three dimensional digital representation of the structure of interest and is stored as data structure. At step 504, various sensors are positioned on the structure. As discussed above, these include GPS sensors, gyro compasses, pressure sensors and/or tilt meters. At step 506, the virtual model is updated with the sensor location information as described above.

At step 508, structure 100 is in the process of being positioned. During the positioning process, the sensor data provided by the remote sensors is monitored at the base station 200 using radio link 220. In one embodiment, real-time sensor information from each of the sensors positioned on structure 100 is multiplexed on a radio signal by radio 106 and transmitted via antenna 114 across radio link 220 to radio 210 located at base station 200. Radio 210 receives the radio link transmission 220 via antenna 214 and demultiplexes and demodulates the radio signal so as to present each of the individual sensor data on bus 206. For those embodiments where CPU 202 is located onboard structure 100, the sensor data is monitored through the use of hard wired connections between the sensors and CPU 202. For convenience, the remainder of this discussion assumes that radio link 220 is used.

At step 510, CPU 202 uses the real-time sensor data provided by radio 210 to update the virtual model stored in memory 208. The virtual model is updated to represent the actual location, attitude and orientation of structure 100 as it is being positioned. In this regard, sensor data from GPS sensors 102, aided by correction information from GPS base station 204, provide precise positioning information using real-time kinematic or differential GPS techniques. Sensor data from gyro 108 is used to provide orientation information for the virtual model. Data from pressure sensors 110 provides depth information for those portions of structure 100 which are located below water level. Data from tilt meters 112 provides attitude information regarding structure 100.

Figure 6:
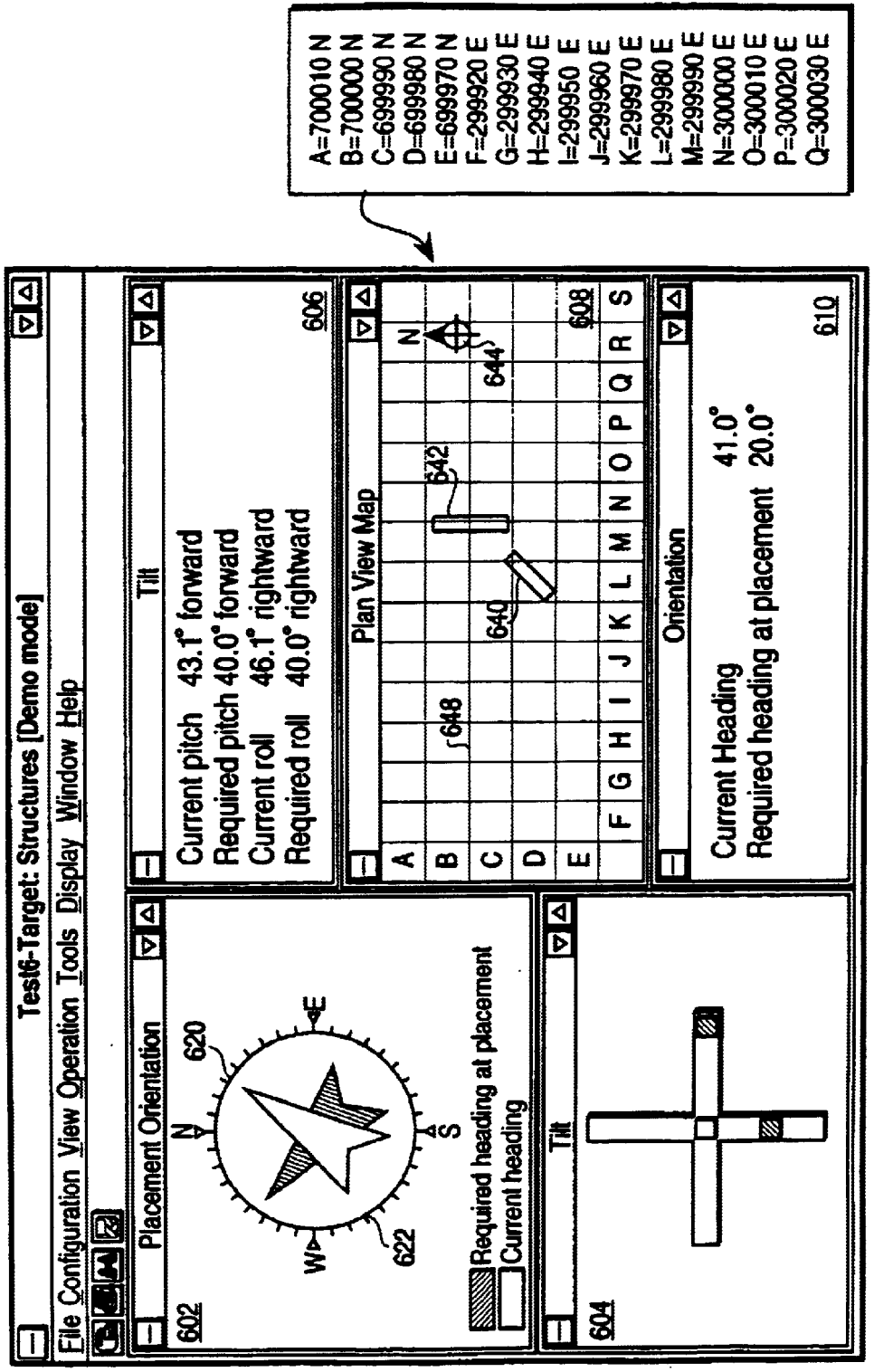
FIG. 6 is a composite display showing a number of windows.

At step 512, the current state of structure 100, i.e., the position, attitude and orientation of structure 100, is displayed on display 212. FIG. 6 shows an exemplary display layout. FIG. 6 is composite display showing a number of windows 602, 604, 606, 608 and 610. Window 602 is a placement orientation window showing the current heading, i.e., orientation, of structure 100. Placement orientation window 602 includes a compass rose 620 and a position arrow 622. Position arrow 622 shows the current orientation or heading of structure 100 with regard to compass rose 620. The data required to produce the heading display in placement orientation window 602 is derived from the sensor data produced by the various sensors onboard structure 100. For example, if GPS sensors 102 are located along a centerline of structure 100, a vector can be derived and compared with real world coordinates to produce the heading arrow 622.

Alternatively, if a gyro compass 108 is used, the heading information can be derived directly from the gyro compass 108 output CPU 202 executes the instructions necessary to compute the heading information for display within window 602.

Window 604 is a tilt window and provides attitude information concerning structure 100. Tilt window 604 is made up of two vertical bars 630 and 632. Within each vertical bar 630, 632 an attitude guidance information cursor 634, 636 is located. Each attitude guidance information cursor 634, 636 moves within its respective vertical bar 632, 630 in response to attitude information signals from sensors located on structure 100. The attitude information signals may be derived from tilt meters 112 and/or GPS sensors 102. CPU 202 executes the instructions necessary to convert these signals to attitude information for display within window 604. The attitude information cursors 634, 636 provide a visual reference indicating the degree of pitch or roll currently being experienced by structure 100.

Tilt window 604 is supplemented by tilt text window 606. Tilt text window 606 provides a textual, rather than graphical, representation of the current pitch and roll being experienced by structure 100. The information used to produce the pitch and roll parameters displayed in tilt text window 606 is obtained from the same sensors as were used to produce the information for tilt window 604. As shown in tilt text window 606, in addition to displaying the current pitch and roll of structure 100, the desired pitch and roll which have been previously stored can also be displayed. This provides an operator with the information necessary for maneuvering structure 100 along the pitch and roll axes during the positioning operation.

Window 608 is a plan view of the positioning operation. Shown in the plan view map of window 608 is a two-dimensional illustration 640 of structure 100. Structure illustration 640 indicates the current position of structure 100 during the positioning operation. Illustration 640 is shown in the orientation and position indicated by the data from the various sensors located onboard structure 100. Also shown in plan view window 608 is illustration 642 which indicates the desired position and orientation of structure 100 upon completion of the positioning operation. Using plan view window 608, an operator can readily determine the operations necessary to precisely position structure 100. Optionally shown within plan view window 608 are compass illustration 644 and grid layout 648. These features are shown and may be provided for operator convenience.

Orientation text window 610 indicates the current and desired heading of structure 100. The current heading information is derived from the sensor data just as the orientation information for window 602 was derived. The required heading information is derived from pre-programmed parameters, just as the desired pitch and roll indications were obtained.

Returning to FIG. 5, at step 514, the structure 100 is positioned according to the information provided by the display readouts. Those skilled in the art will appreciate that the positioning operation can be performed manually, or remotely using control signals generated by CPU 202 and relayed to structure via radio 210. In such an automatic positioning embodiment, structure 100 would also contain auto pilot controls (not shown) to allow for the precise positioning of structure 100 via remote control.

At step 516 a determination is made as to whether the structure 100 has been located in the proper position, orientation and attitude. If not, the process repeats the above steps 508 to 514 until the desired position, orientation and attitude is achieved. Once the structure 100 has been positioned properly, process 500 quits at step 518.

In an alterative embodiment, after structure 100 has been positioned properly, CPU 202 collects a user defined set of data. This data may include a relatively long record of sensor information, e.g., on the order of 10 min., from the sensors onboard structure 100. The data is collected in the manner described above and stored in memory 208 or a similar storage device. The data is averaged to eliminate spurious readings (e.g., caused by noise in radio link 220) and mean values and standard deviations are computed. The result of this data collection is a virtual model that accurately reflects the "as built" status of structure 100. This information can be used to generate an "as built" report, which is a summary of the best estimate of the final position of structure 100 for an engineering report.

Thus, a method and apparatus for the precise positioning of large structures has been described. In the foregoing specification, the present invention has been described with reference to specific exemplary embodiments thereof. It will, however, be evident that various modifications and changes maybe made thereto without departing from the broader and spirit and scope of the invention as set forth in the appended claims. The specification and drawings are, accordingly, to be regarded in an illustrative rather than a restrictive sense.

What is claimed is:

1. A precise positioning apparatus comprising:
a system bus;
a GPS receiver configured to communicate with the system bus, the GPS receiver generating position information regarding a position of a structure associated with the GPS receiver;
a memory configured to communicate with the system bus;
a display configured to communicate with the system bus;
a microprocessor configured to communicate with the system bus, the microprocessor configured to receive the position information from the GPS receiver and configured to generate display information based on the position information, the display information comprising guidance and orientation information, the microprocessor configured to transmit the display information to the display,
wherein the display information is displayed on the display such that a user is provided with a visual graphical representation of a present position, orientation and attitude of the structure and a desired position, orientation and attitude of the structure.

2. A precise positioning apparatus as in claim 1 further comprising a communication system, the communication system coupled to the GPS receiver and to the system bus, the communication system providing a link for communicating information from the GPS receiver to the microprocessor.

3. A precise positioning system as in claim 2 wherein the communication system comprises a two-way radio communication system.

4. A communication system as in claim 2 wherein the communication system comprises an optical communication system.

5. A precise positioning system as in claim 2 further comprising an orientation sensor, the orientation sensor generating orientation information regarding the orientation of the structure, the orientation sensor coupled to the communication system, wherein the communication system further providing a link for communicating orientation information from the orientation sensor to the microprocessor.

6. A precise positioning system as in claim 5 wherein the orientation sensor comprises a gyro compass.

7. A precise positioning system as in claim 2 further comprising an attitude sensor, the attitude sensor generating pitch information regarding the structure, the attitude sensor coupled to the communication system, wherein the communication system further providing a link for communicating the pitch information from the orientation sensor to the microprocessor.

8. A precise positioning system as in claim 7 wherein the attitude sensor further generating roll information regarding the structure, and wherein the communication system further providing a link for communicating the roll information to the microprocessor.

9. A precise positioning system as in claim 8 wherein the attitude sensor comprises a tilt meter.

10. A precise positioning system as in claim 2 further comprising a pressure sensor, the pressure sensor generating depth information regarding the structure, the pressure sensor coupled to the communication system, wherein the communication system further providing a link for communicating the depth information from the pressure sensor to the microprocessor.

* * * * *